(12) United States Patent
Ely et al.

(10) Patent No.: US 7,133,793 B2
(45) Date of Patent: Nov. 7, 2006

(54) MAGNETIC CALIBRATION ARRAY

(75) Inventors: David Ely, Waterbeach (GB); Gareth McCaughan, Waterbeach (GB)

(73) Assignee: Synaptics (UK) Limited, Cambridgeshire (GB)

( * ) Notice: Subject to any disclaimer, the term of this patent is extended or adjusted under 35 U.S.C. 154(b) by 279 days.

(21) Appl. No.: 10/896,917

(22) Filed: Jul. 23, 2004

(65) Prior Publication Data

US 2005/0021269 A1  Jan. 27, 2005

(30) Foreign Application Priority Data

Jul. 24, 2003  (GB) .................... 0317370.5

(51) Int. Cl.
*G01C 19/00* (2006.01)
(52) U.S. Cl. .................... 702/104; 702/95; 702/150
(58) Field of Classification Search ............... 702/104, 702/95, 150
See application file for complete search history.

(56) References Cited

U.S. PATENT DOCUMENTS

| | | | |
|---|---|---|---|
| 2,145,742 A | 1/1939 | Wechsung |
| 2,867,783 A | 1/1959 | Childs |
| 2,942,212 A | 6/1960 | Mynall |
| 3,219,956 A | 11/1965 | Newell et al. |
| 3,297,940 A | 1/1967 | Mulligan et al. |
| 3,482,242 A | 12/1969 | Hargrove |
| 3,647,963 A | 3/1972 | Bailey |
| 3,772,587 A | 11/1973 | Ferrand et al. |
| 3,812,481 A | 5/1974 | Stednitz |
| 3,851,242 A | 11/1974 | Ellis |
| 3,873,770 A | 3/1975 | Ioannou |
| 3,895,356 A | 7/1975 | Kraus |
| 3,898,635 A | 8/1975 | Kulterman |
| 3,906,436 A | 9/1975 | Kurauchi et al. |
| 3,962,663 A | 6/1976 | Visser |
| 4,005,396 A | 1/1977 | Fujiwara et al. |
| 4,014,015 A | 3/1977 | Gundlach |
| 4,065,850 A | 1/1978 | Burr et al. |
| 4,081,603 A | 3/1978 | Davis et al. |
| 4,092,852 A | 6/1978 | Fowler et al. |
| 4,094,572 A | 6/1978 | Burr et al. |
| 4,097,684 A | 6/1978 | Burr |
| 4,150,352 A | 4/1979 | Pomella et al. |
| 4,156,192 A | 5/1979 | Schedrovitsky et al. |
| 4,210,775 A | 7/1980 | Rodgers et al. |
| 4,223,300 A | 9/1980 | Wiklund |

(Continued)

FOREIGN PATENT DOCUMENTS

DE  1134848  8/1962

(Continued)

OTHER PUBLICATIONS

Patent Abstracts of Japan, vol. 010, No. 009, (P-420), Jan. 14, 1986 & JP 60 165512 A (Toshiba KK), Aug. 28, 1985.

(Continued)

*Primary Examiner*—Michael Nghiem
*Assistant Examiner*—Stephen J. Cherry
(74) *Attorney, Agent, or Firm*—Nixon & Vanderhye P.C.

(57) ABSTRACT

A calibration system is provided for use in generating calibration data for calibrating an X-Y digitiser. The calibration system uses an alignment head having an array of magnetic field generators which are for alignment with the X-Y digitiser. Each of the magnetic field generators is individually drivable so that calibration data can be obtained for different positions on the X-Y digitiser corresponding to the positions of the magnetic field generators in the array. The resulting calibration data is then used to generate a correction map which is stored in the X-Y digitiser

68 Claims, 5 Drawing Sheets

U.S. PATENT DOCUMENTS

| | | |
|---|---|---|
| 4,255,617 A | 3/1981 | Carau, Sr. et al. |
| 4,341,385 A | 7/1982 | Doyle et al. |
| 4,358,723 A | 11/1982 | Scholl et al. |
| 4,387,509 A | 6/1983 | Dechelette |
| 4,423,286 A | 12/1983 | Bergeron |
| 4,425,511 A | 1/1984 | Borsh |
| 4,482,784 A | 11/1984 | Whetstone |
| 4,504,832 A | 3/1985 | Conte |
| 4,507,638 A | 3/1985 | Brosh |
| 4,514,688 A * | 4/1985 | Whetstone ............... 178/18.02 |
| 4,532,376 A | 7/1985 | Rockwell |
| 4,577,057 A | 3/1986 | Blesser |
| 4,577,058 A | 3/1986 | Collins |
| 4,593,245 A | 6/1986 | Vierti et al. |
| 4,609,776 A | 9/1986 | Murakami et al. |
| 4,642,321 A | 2/1987 | Schoenberg et al. |
| 4,672,154 A | 6/1987 | Rodgers et al. |
| 4,686,501 A | 8/1987 | Sing et al. |
| 4,693,778 A | 9/1987 | Swiggett et al. |
| 4,697,050 A | 9/1987 | Farel et al. |
| 4,697,144 A | 9/1987 | Howbrook |
| 4,697,244 A | 9/1987 | Murakami et al. |
| 4,704,501 A | 11/1987 | Taguchi et al. |
| 4,709,209 A | 11/1987 | Murakami et al. |
| 4,711,026 A | 12/1987 | Swiggett et al. |
| 4,711,977 A | 12/1987 | Miyamori et al. |
| 4,723,446 A | 2/1988 | Saito et al. |
| 4,734,546 A | 3/1988 | Landmeier |
| 4,737,698 A | 4/1988 | McMullin et al. |
| 4,748,295 A | 5/1988 | Rogers |
| 4,752,655 A | 6/1988 | Tajiri et al. |
| 4,786,765 A | 11/1988 | Yamanami et al. |
| 4,820,961 A | 4/1989 | McMullin |
| 4,821,002 A | 4/1989 | Luly |
| 4,848,496 A | 7/1989 | Murakami et al. |
| 4,868,443 A | 9/1989 | Rossi |
| 4,878,553 A | 11/1989 | Yamanami et al. |
| 4,891,590 A | 1/1990 | Hammel et al. |
| 4,893,077 A | 1/1990 | Auchterlonie |
| 4,902,858 A | 2/1990 | Yamanami et al. |
| 4,963,703 A | 10/1990 | Phillips |
| 4,975,546 A | 12/1990 | Craig |
| 4,985,691 A | 1/1991 | Pulyer et al. |
| 4,988,837 A | 1/1991 | Murakami et al. |
| 4,999,461 A | 3/1991 | Murakami et al. |
| 5,004,872 A | 4/1991 | Lasley |
| 5,013,047 A | 5/1991 | Schwab |
| 5,023,408 A | 6/1991 | Murakami et al. |
| 5,028,745 A | 7/1991 | Yamanami et al. |
| 5,041,785 A | 8/1991 | Bogaerts et al. |
| 5,045,645 A | 9/1991 | Hoendervoogt et al. |
| 5,059,180 A | 10/1991 | McLees |
| 5,066,833 A | 11/1991 | Zalenski |
| 5,082,286 A | 1/1992 | Ryan et al. |
| 5,088,928 A | 2/1992 | Chan |
| 5,122,623 A | 6/1992 | Zank et al. |
| 5,129,654 A | 7/1992 | Bogner |
| 5,134,689 A | 7/1992 | Murakami et al. |
| 5,136,125 A | 8/1992 | Russell |
| 5,177,389 A | 1/1993 | Schalk |
| 5,188,368 A | 2/1993 | Ryan |
| 5,206,785 A | 4/1993 | Hukashima |
| 5,218,174 A | 6/1993 | Gray et al. |
| 5,225,637 A | 7/1993 | Rodgers et al. |
| 5,239,489 A | 8/1993 | Russell |
| 5,245,336 A | 9/1993 | Chen et al. |
| 5,247,137 A | 9/1993 | Epperson |
| 5,247,138 A | 9/1993 | Landmeier |
| 5,274,198 A | 12/1993 | Landmeier |
| 5,342,136 A | 8/1994 | Fukami |
| 5,349,139 A | 9/1994 | Verrier et al. |
| 5,357,062 A | 10/1994 | Rockwell et al. |
| 5,369,227 A | 11/1994 | Stone |
| 5,381,091 A | 1/1995 | Kobayashi et al. |
| 5,406,155 A | 4/1995 | Persson |
| 5,434,372 A | 7/1995 | Lin |
| 5,461,204 A | 10/1995 | Makinwa et al. |
| 5,486,731 A | 1/1996 | Masaki et al. |
| 5,525,981 A | 6/1996 | Abernethy |
| 5,554,827 A | 9/1996 | Oda |
| 5,557,076 A | 9/1996 | Wieczorek et al. |
| 5,571,997 A | 11/1996 | Gray et al. |
| 5,600,105 A | 2/1997 | Fukuzaki et al. |
| 5,619,431 A | 4/1997 | Oda |
| 5,625,239 A | 4/1997 | Persson et al. |
| 5,635,683 A | 6/1997 | McDermott et al. |
| 5,646,496 A | 7/1997 | Woodland et al. |
| 5,657,011 A | 8/1997 | Komatsu et al. |
| 4,878,553 A | 9/1997 | Yamanami et al. |
| 5,691,513 A | 11/1997 | Yamamoto et al. |
| 5,691,748 A | 11/1997 | Fukuzaki |
| 5,693,913 A | 12/1997 | Sudo et al. |
| 5,693,993 A | 12/1997 | Ito et al. |
| 5,748,110 A | 5/1998 | Sekizawa |
| 5,751,229 A | 5/1998 | Funahashi |
| 5,783,940 A | 7/1998 | Kolomeitsev |
| 5,815,091 A | 9/1998 | Dames |
| 5,818,091 A | 10/1998 | Lee et al. |
| 5,818,431 A | 10/1998 | Oh et al. |
| 5,826,473 A | 10/1998 | Saka et al. |
| 5,854,449 A | 12/1998 | Adkins |
| 5,864,098 A | 1/1999 | Shinohe |
| 5,866,847 A | 2/1999 | Saka et al. |
| 5,895,895 A | 4/1999 | Ono et al. |
| 5,914,735 A | 6/1999 | Yamamoto et al. |
| 5,943,044 A | 8/1999 | Martinelli et al. |
| 6,002,387 A | 12/1999 | Ronkka et al. |
| 6,005,555 A | 12/1999 | Katsurahira et al. |
| 6,124,708 A | 9/2000 | Dames |
| 6,236,199 B1 | 5/2001 | Irle et al. |
| 6,239,789 B1 | 5/2001 | Sekizawa et al. |
| 6,249,135 B1 | 6/2001 | Maruyama et al. |
| 6,249,234 B1 | 6/2001 | Ely et al. |
| 6,249,235 B1 | 6/2001 | Iwasaki |
| 6,255,810 B1 | 7/2001 | Irle et al. |
| 6,262,684 B1 | 7/2001 | Stewart et al. |
| 6,288,710 B1 | 9/2001 | Lee et al. |
| 6,304,014 B1 | 10/2001 | England et al. |
| 6,304,076 B1 | 10/2001 | Madni et al. |
| 6,489,899 B1 | 12/2002 | Ely et al. |
| 6,513,943 B1 | 2/2003 | Fukuyoshi |
| 6,522,128 B1 | 2/2003 | Ely et al. |
| 6,534,970 B1 | 3/2003 | Ely et al. |
| 6,667,740 B1 | 12/2003 | Ely et al. |
| 6,705,511 B1 | 3/2004 | Dames et al. |
| 6,727,896 B1 * | 4/2004 | Tsang ........................ 345/178 |
| 6,788,221 B1 | 9/2004 | Ely et al. |
| 6,797,895 B1 | 9/2004 | Lapstun et al. |
| 6,798,404 B1 | 9/2004 | Sharma |
| 6,888,538 B1 | 5/2005 | Ely et al. |
| 2001/0001430 A1 | 5/2001 | Ely et al. |
| 2001/0006369 A1 | 7/2001 | Ely |

FOREIGN PATENT DOCUMENTS

| | | |
|---|---|---|
| DE | 3500121 | 7/1986 |
| DE | 3620412 | 12/1987 |
| EP | 0159191 A2 | 10/1985 |
| EP | 0182085 A2 | 5/1986 |
| EP | 0182085 A3 | 5/1986 |
| EP | 0209513 A1 | 6/1986 |
| EP | 0218745 | 4/1987 |
| EP | 0 307 667 | 3/1989 |
| EP | 0313046 | 4/1989 |

| | | |
|---|---|---|
| EP | 0 499 641 | 8/1992 |
| EP | 0 511 406 | 11/1992 |
| EP | 0537458 | 4/1993 |
| EP | 0552001 A1 | 7/1993 |
| EP | 0554900 | 8/1993 |
| EP | 0607694 A1 | 7/1994 |
| EP | 0657917 A1 | 6/1995 |
| EP | 0 672 997 | 9/1995 |
| EP | 0675581 A1 | 10/1995 |
| EP | 0680009 | 11/1995 |
| EP | 0680009 A2 | 11/1995 |
| EP | 0709648 A2 | 5/1996 |
| EP | 0716390 | 6/1996 |
| EP | 0743508 | 11/1996 |
| EP | 0772149 | 5/1997 |
| FR | 1325017 | 4/1963 |
| FR | 2298082 | 8/1976 |
| FR | 2682760 | 4/1993 |
| GB | 851543 | 10/1960 |
| GB | 1122763 | 8/1968 |
| GB | 1452132 | 10/1976 |
| GB | 2012431 A | 7/1979 |
| GB | 2021273 A | 11/1979 |
| GB | 2042183 A | 9/1980 |
| GB | 2059593 A | 4/1981 |
| GB | 2064125 A | 6/1981 |
| GB | 2074736 A | 11/1981 |
| GB | 1604824 | 12/1981 |
| GB | 2103943 A | 3/1983 |
| GB | 2141235 A | 12/1984 |
| JP | 63-211014 A | 9/1988 |
| JP | 02-248816 | 10/1990 |
| JP | 406051905 A | 2/1994 |
| TW | 287267 | 1/1996 |
| TW | 347542 | 11/1998 |
| WO | 92/12401 | 7/1992 |
| WO | 94/25829 | 11/1994 |
| WO | 95/31696 | 11/1995 |
| WO | 96/03188 A1 | 2/1996 |
| WO | 97/14935 | 4/1997 |
| WO | 98/00921 | 1/1998 |
| WO | 98/54545 | 12/1998 |
| WO | 98/58237 A | 12/1998 |
| WO | 99/34171 | 7/1999 |
| WO | 00/33244 A | 6/2000 |

OTHER PUBLICATIONS

Klatt, "Phase of Digital Data Fixes Shaft Angle", Electrical Design News, vol. 16, No. 12, Jun. 15, 1971, pp. 53-56. XP002045871.

Patent Abstracts of Japan, vol. 15, No. 37, (P-1159), Jan. 29, 1991 & JP 02 275314 A (Omron Tateisi Electron Co), Nov. 9, 1990.

Patent Abstracts of Japan, vol. 10, No. 32 (E-379), Feb. 7, 1986 & JP 60 189231 A (Matsushita Denki Sangyo KK), Sep. 26, 1985.

Pulle et al., "A New Magnetoresistive Based Sensor for Switched Reluctance Drives", Proceedings of the Annual Power Electronics Specialists Conference (PECS), Toledo, Jun. 29-Jul. 3, 1992, vol. 2, No. Conf. 23. Jun. 29, 1992. pp. 839-843, Institute of Electrical and Electronics Engineers.

Search Report for UK Application No. GB0416614.6 dated Oct. 22, 2004.

Search Report for PCT Application No. PCT/GB 99/03989 (published as WO 00/33244 A3) dated Aug. 23, 2000.

Search Report for PCT Application No. PCT/GB 03/02432 (published as WO 2003/105072 A3) dated May 11, 2004.

McDonnel, "The Use of Inductosyn to Digital Converters in Linear Control Systems", AUTOMATION, vol. 10, No. 11-12, Nov. 1975-Dec. 1975, pp. 31-32.

Electronics Letters, vol. 11, No. 1, Jan. 9, 1975, pp. 5-6, Gordon, "Digital xy Position Indicator Using Walsh Functions".

International Search Report for International Patent Application No. PCT/GB02/05247 dated May 23, 2005.

International Search Report for International Patent Application No. PCT/GB02/02387 dated Jan. 8, 2004.

British Examination Report for British Patent Application No. GB0422091.9 dated Jun. 1, 2005.

"Physics 2CL Lab Manual" Online! 1999, XP002327778, Retrieved from the Internet: URL:http://hep.ucsd.edu/dbmacf/1998-1999/2cl/manual/experiment3.pdf, Retrieved on May 11, 2005, pp. 51-61.

* cited by examiner

MAGNETIC CALIBRATION ARRAY

The present invention relates to a calibration system for use in generating calibrating data for position sensing devices. The invention has particular although not exclusive relevance to systems for generating calibration data for inductive digitising tablets used in tablet PCs, PDAs, mobile telephones etc.

Calibration systems for providing calibration data for use in improving the accuracy of inductive two dimensional digitiser systems are known. The calibration data that is generated normally includes a "correction map" which is usually a set of numbers stored in the digitiser that can be combined with measured sensor data to obtain improved position estimates of a position indicator (e.g. stylus pen). By applying the appropriate correction values for the sensed position, it is possible to calibrate out non-linearities inherent in the inductive digitising system. This correction map is usually generated mathematically from a set of position error data taken from a reference system. That position error data is, in turn, normally generated from a test system that uses a robot to move a test stylus across the reference system's digitiser in two or more dimensions.

One problem with this prior art technique is that it takes a relatively long time to obtain the position error data from an adequate number of positions across the digitiser working area. For example, a digitising system designed for use with a 30 cm diagonal display might typically require position error data points on a 4 mm grid, resulting in several thousand data points being required. Therefore, even if the calibration system can measure appropriate position error data for several data points per second, the data capture for the entire correction map will take a number of hours. As a result, it is impractical, for manufacturing cost reasons, to calibrate each digitiser system produced in a production line. It is therefore impractical to eliminate device to device errors caused by manufacturing tolerances in the sensor system's electronic and magnetic components or errors caused by small mechanical differences in each device, including the position of conductive or ferromagnetic materials.

One aim of the present invention is to provide an alternative calibration system which is simpler and which alleviates one or more of the above problems.

One embodiment of the invention provides an alternative calibration system which allows the rapid generation of position error data at high signal to noise ratio and low cost by using an alignment head having an array of test styluses or their equivalent. This allows a correction map to be generated for each digitiser system that is integrated into a host product as part of the production process, resulting in improved accuracy and higher quality of product.

A number of exemplary embodiments will now be described with reference to the accompanying drawings in which.

Figure 2:
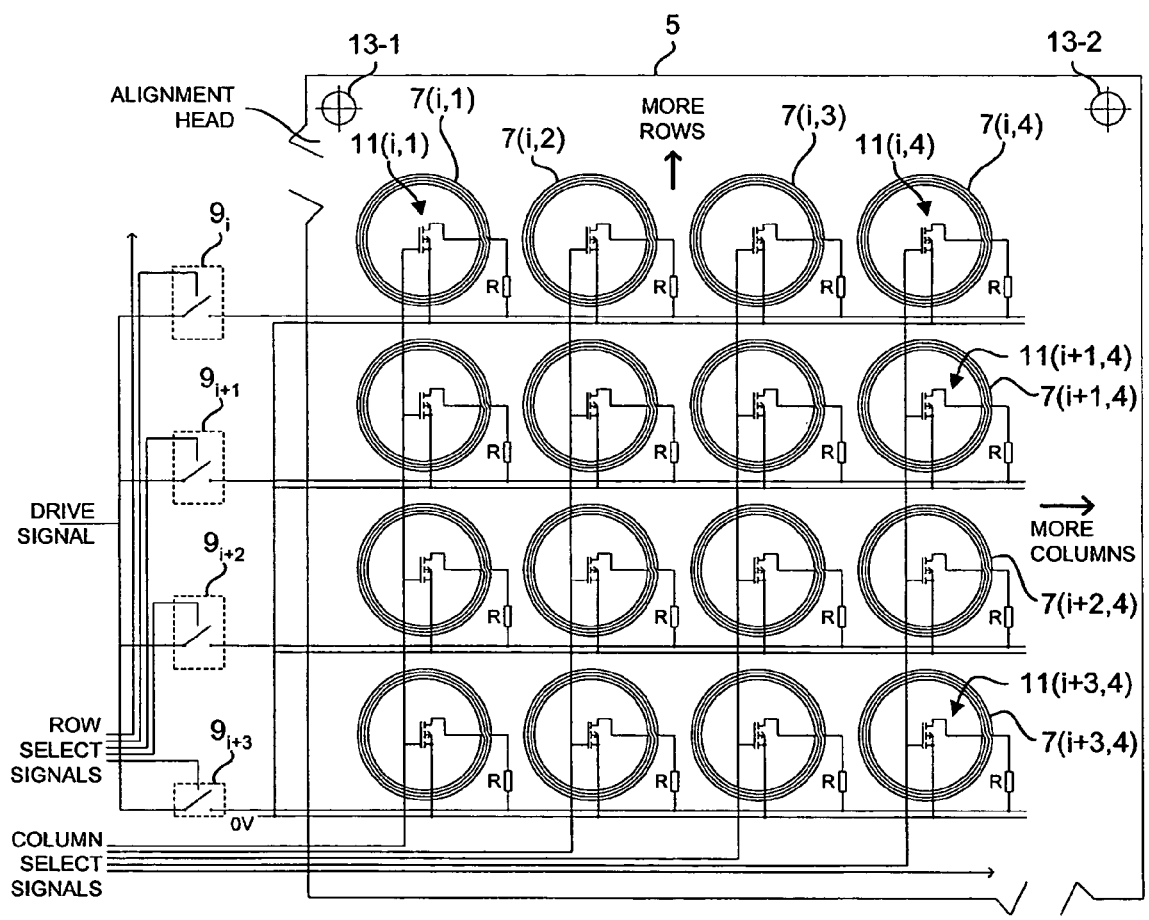
FIG. 2 is a schematic diagram illustrating the main components of the alignment head shown in FIG. 1.
Figure 4:
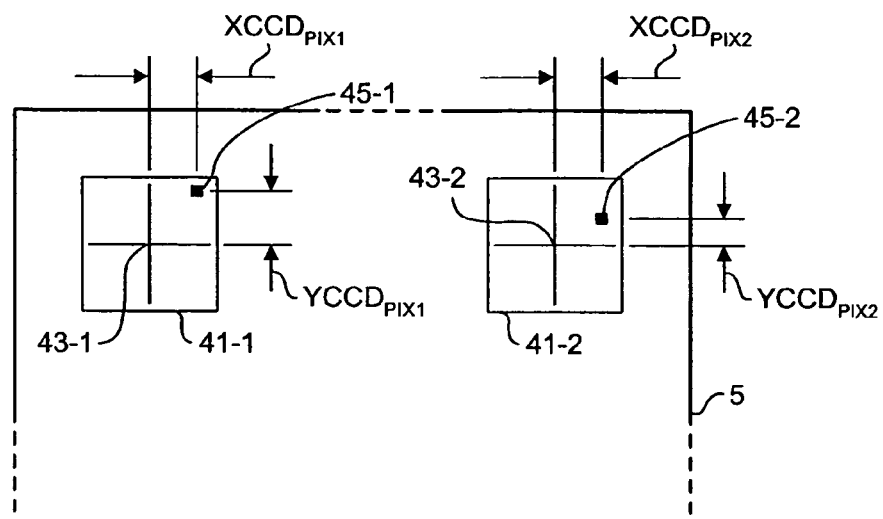
Figure 6A:
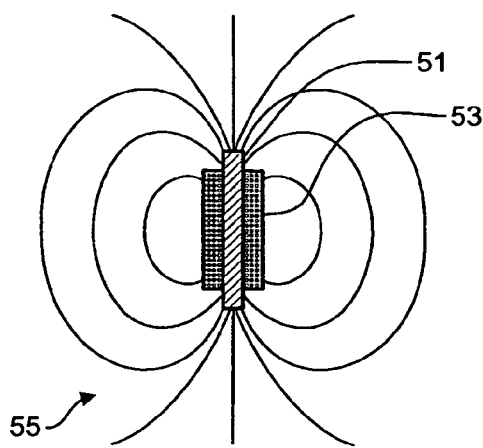
Figure 6B:
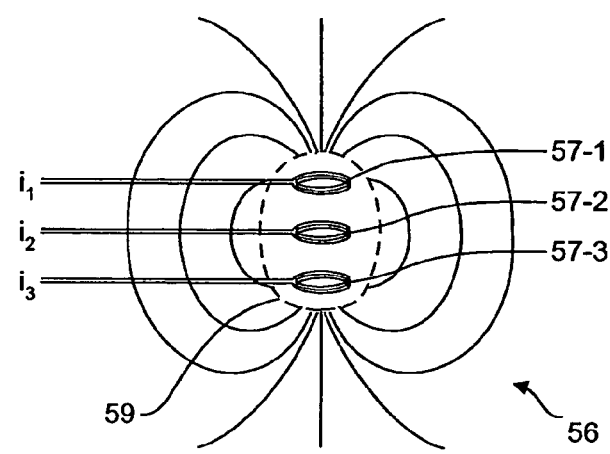
Figure 5:
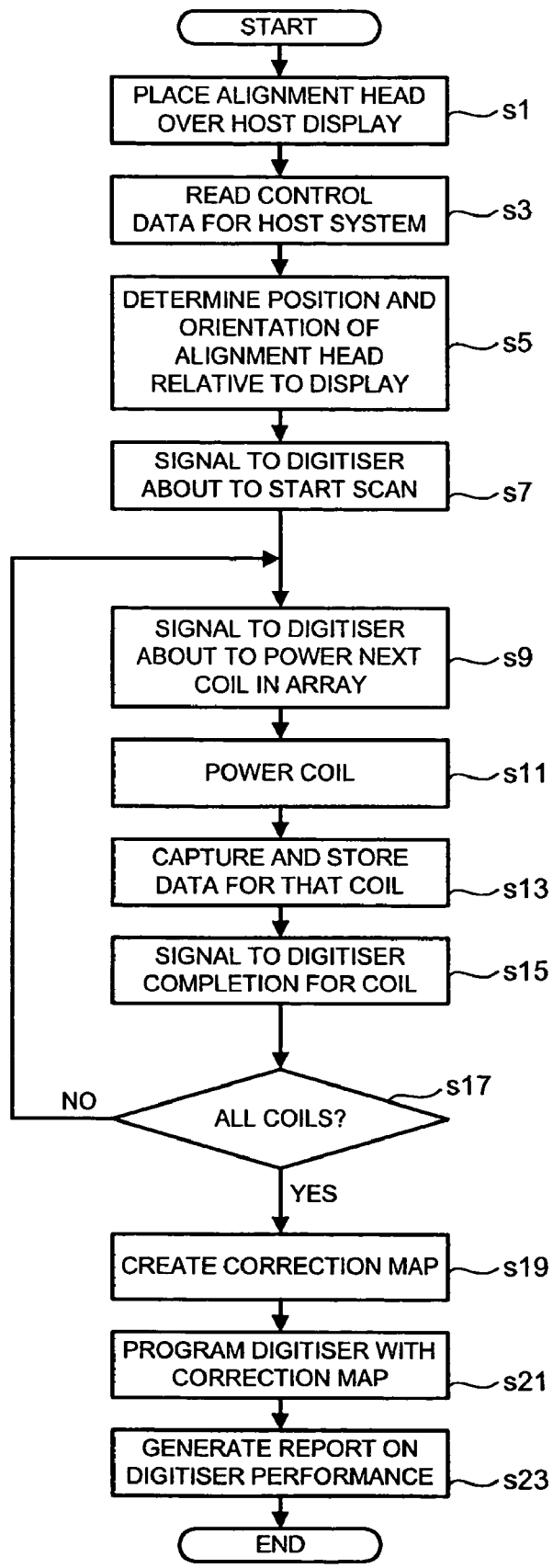
Figure 6C:
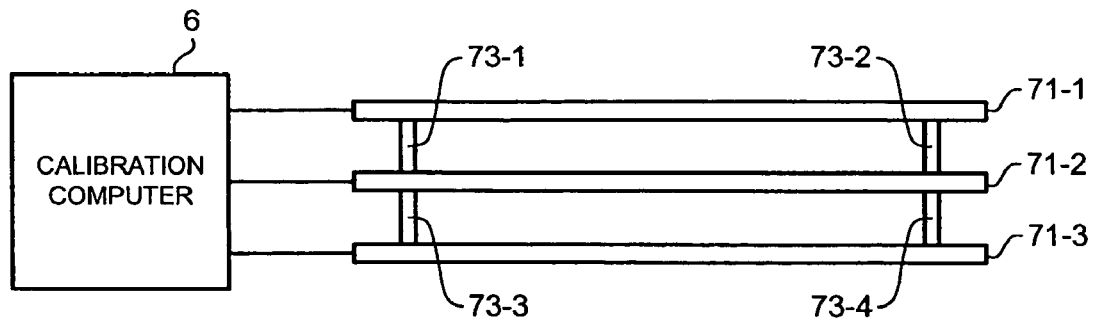
Figure 7:
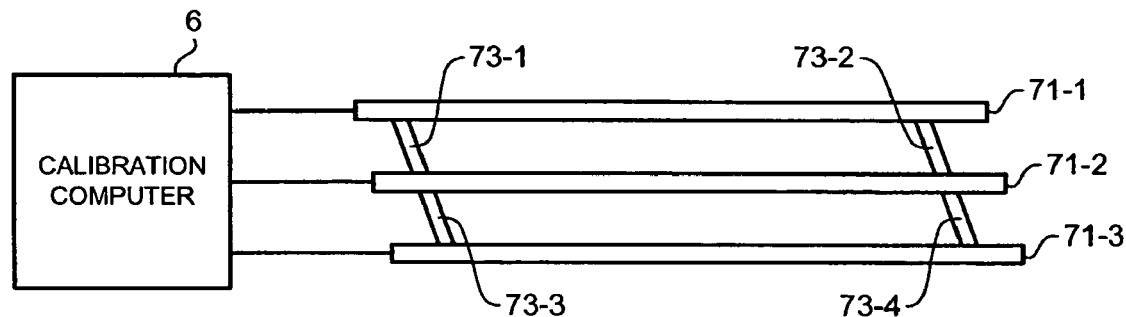
Figure 8:
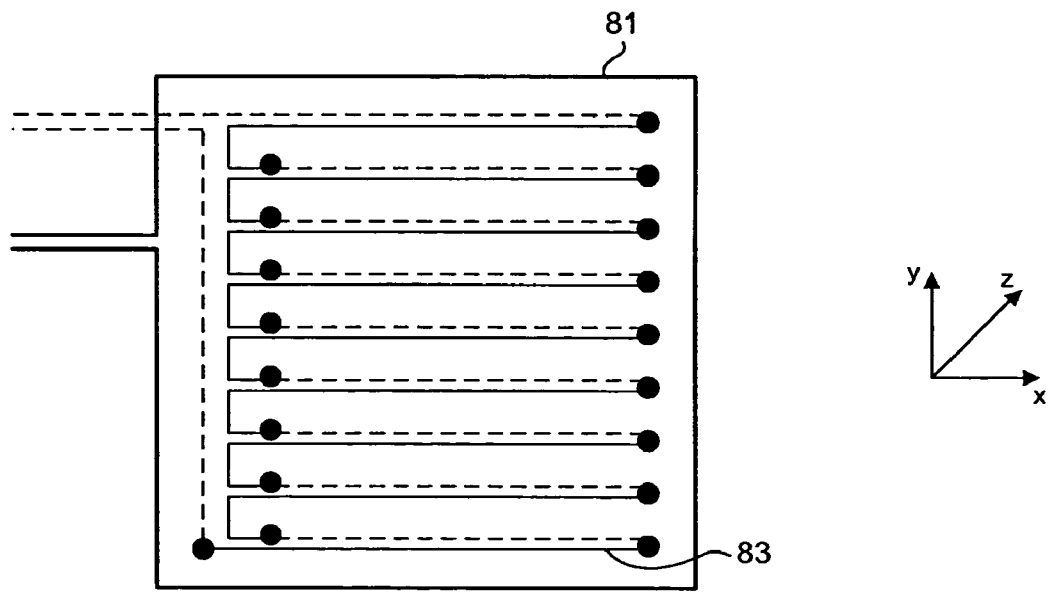

FIG. 4 schematically illustrates the field of view of two cameras forming part of the alignment head shown in FIG. 2 and illustrating the position of respective test pixels displayed on the tablet PC when the alignment head is approximately aligned therewith;

FIG. 5 is a flow chart illustrating the main steps involved in a preferred way of determining calibration data for the digitising tablet under test;

FIG. 6a schematically illustrates the magnetic field generated by a stylus having a magnetically permeable core and a coil wound thereon;

FIG. 6b schematically illustrates how a comparable magnetic field can be generated by three spaced and individually drivable coils;

FIG. 6c illustrates an alignment head using three printed circuit boards carrying three arrays of coils to generate an array of the three coil stylus equivalents shown in FIG. 6b;

FIG. 7 illustrates a way in which the three printed circuit boards shown in FIG. 6c can be moved to simulate the effects of stylus tilt so that calibration data can be obtained to compensate for the effects of stylus tilt; and FIG. 8 schematically illustrates a layout of coils formed on a single printed circuit board which can be used to simulate the effects of stylus tilt.

OVERVIEW

The calibration system that will be described below can be used to determine calibration data for any product employing an X-Y inductive digitising tablet. Typical products include tablet PCs, Personal Digital Assistants (PDAs), mobile telephones etc. Any type of inductive X-Y digitising tablet may be used such as those described in WO 00/33244, U.S. Pat. Nos. 4,878,533, U.S. 5,130,500, U.S. 5,214,427 etc.

Figure 1:
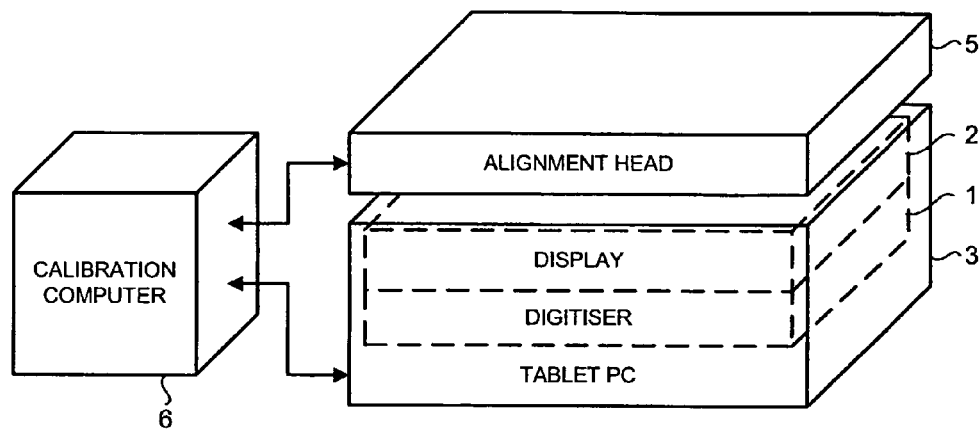
FIG. 1 is a schematic diagram illustrating an alignment head and a calibration computer that are used to generate calibration data for a tablet PC.

FIG. 1 schematically illustrates the calibration system when used to calibrate an X-Y digitiser 1 provided behind the display 2 of a tablet PC 3. As shown, the calibration system includes an alignment head 5 which, during calibration, is mechanically aligned over the display 2 of the tablet PC 3 using a jig (not shown) that holds the tablet PC 3 and the alignment head 5. In this embodiment, the alignment head 5 includes a two dimensional array of individually selectable magnetic field generators (not shown) which, when energised, each generate a magnetic field over a respective point of the display 2 of the tablet PC 3. The jig places the alignment head 5 over the display 2 so that the magnetic axes of the magnetic field generators are substantially perpendicular to the plane of the display 2.

As shown in FIG. 1, the calibration system also includes a calibration computer 6 which controls the alignment head 5 and which communicates with the tablet PC 3. More specifically, the calibration computer 6 controls the alignment head 5 to cause each of the magnetic field generators to generate a magnetic field one at a time. The magnetic field generated by each magnetic field generator interacts with the inductive X-Y digitiser 1 which, in response, outputs a signal indicative of the X-Y position of the corresponding magnetic field generator. This sensed position information is output by the tablet PC 3 to the calibration computer 6. The calibration computer 6 then compares the known position of the selected magnetic field generator with the sensed X-Y digitiser position, to generate calibration data (position error data) for that digitiser X-Y position. The calibration computer 6 calculates similar calibration data for each of the magnetic field generators in the array, from which it generates the above described "correction map". The calibration computer 6 then stores the correction map into non-volatile memory (not shown) in the tablet PC 3, so that it can be used during subsequent use to correct for position errors inherent with the digitiser 1.

Alignment Head

FIG. 2 schematically illustrates the form of the alignment head 5 used in this embodiment. As shown, the alignment head 5 includes a regular two dimensional array of coils (which, in this embodiment, are the above described magnetic field generators), some of which are shown and labelled 7(i,j). Each of the coils 7 is connected to appropriate switching circuitry that allows each coil 7 to be individually energised to thereby generate a magnetic field.

As shown, the switching circuitry includes a set of row select switches 9i which are controlled by a respective row select signal received from the calibration computer 6. FIG. 2 also shows that, when selected, each row select switch 9 passes a drive signal (also received from the calibration computer 6) to one end of each coil 7 in the corresponding row of coils 7. For example, if switch 9i is closed then the drive signal will be applied to one end of coils 7(i,1), 7(i,2), 7(i,3), 7(i,4) etc.

The switching circuitry also includes column select switches 11(i,j), one for each coil 7. As shown, the column select switches 11 for the coils 7 in one column are controlled by a respective column select signal (received from the calibration computer 6) and are used to connect the other end of the coils 7 in the same column to ground (0V). As a result, the calibration computer 6 can control which one of the coils 7 receives the drive signal through the appropriate choice of row select and column select signals.

In this embodiment, the column select switches used are MOSFET type switches which are low cost and low power devices. One characteristic of these and similar devices is that they are unipolar and have undesirable behaviour in the presence of reverse bias.

Therefore, in this embodiment, the drive signal includes two components—an AC component for interacting with the X-Y digitiser 1 of the tablet PC 3 and a DC component to ensure that the AC drive component does not reverse bias the column select switches 11. Matched resistors R are also connected in circuit with the coils 7 to ensure that a known current flows when the drive signal is applied to the coil 7.

In this embodiment, the coils 7 are formed from conductor tracks on a printed circuit board for high accuracy, low cost and simplicity. The switching circuitry and the resistors (R) are also mounted on this printed circuit board.

Finally, as shown in FIG. 2, the alignment head 5 also includes two cameras (eg CCD cameras) 13-1 and 13-2 which are fixed in place relative to the array of coils 7. As will be described below, the signals from these cameras 13 are used to determine a positional alignment between the alignment head 5 and the display 2 of the tablet PC 3. This alignment information is used to relate (map) the known X-Y position of each coil 7 to corresponding X-Y positions on the tablet PC 3.

Calibration Computer

Figure 3:
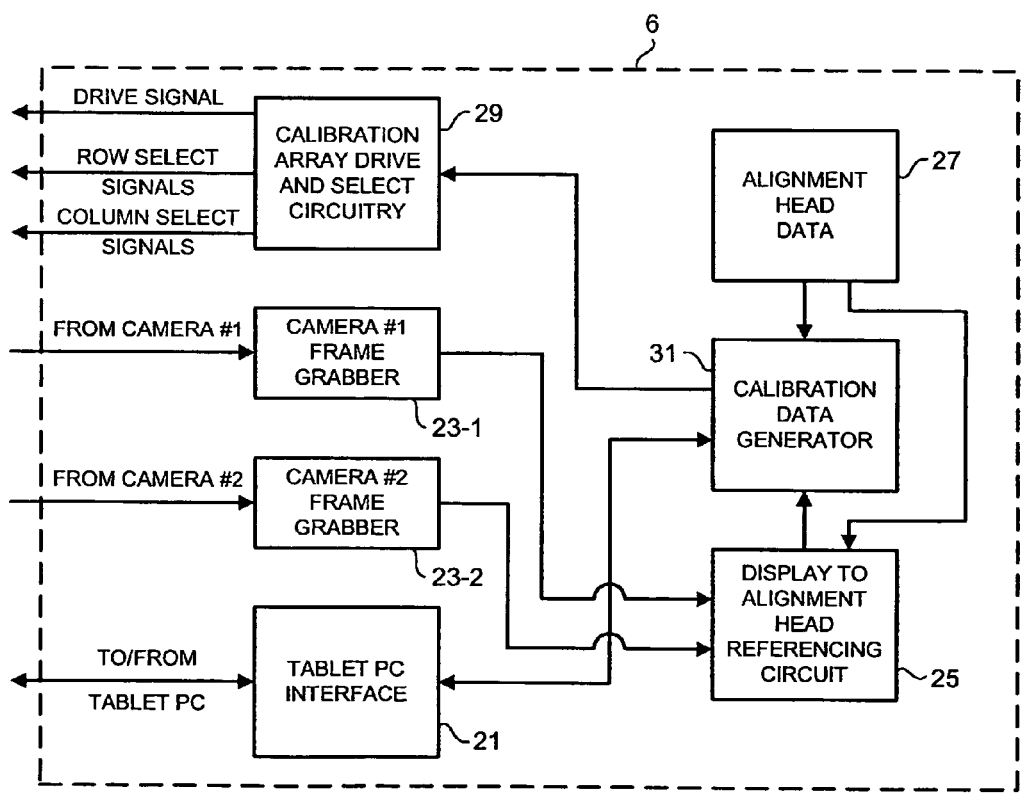
FIG. 3 is a schematic block diagram illustrating the main processing blocks of the calibration computer shown in FIG. 1.

FIG. 3 is a block diagram illustrating the main functional components of the calibration computer 6 used in this embodiment. As shown, the calibration computer 6 includes a tablet PC interface 21 which interfaces the calibration computer 6 with the tablet PC 3. The calibration computer 6 also includes two frame grabber circuits 23-1 and 23-2 which are each associated with and are operable to capture an image from a respective one of the cameras 13 of the alignment head 5. As shown, the images generated by the frame grabbers 23 are output to a display to alignment head referencing circuit 25. As will be described in more detail below, the display to alignment head referencing circuit 25 performs image processing on the images generated by the frame grabbers 23 to determine the relative alignment (position and orientation) between the alignment head 3 and the display 2 of the tablet PC 3. When determining this alignment information, the display to alignment head referencing circuit 25 uses the known relative positions of the cameras 13 as defined by alignment head data 27 and the known relative positions of predetermined features on the tablet PC 3 (also defined in the alignment head data 27).

The calibration computer 6 also includes calibration array drive and select circuitry 29 which operates to generate the drive signal and the row and column select signals discussed above. In this embodiment, the calibration array drive and select circuitry 29 is controlled by a calibration data generator 31. In particular, the calibration data generator 31 controls the calibration array drive and select circuitry 29 in order to select and to energise each of the coils 7 of the alignment head 5 in turn.

The calibration data generator 31 also communicates with the tablet PC 3 via the tablet PC interface 21 in order to inform the tablet PC 3 when a coil 7 is about to be energised and in order to receive the corresponding X-Y digitiser position output by the tablet PC 3. The calibration data generator 31 then uses: i) the known position of each of the coils 7 on the alignment head 5 (obtained from the alignment head data 27), ii) the corresponding X-Y position measurement output by the tablet PC 3 for each of the coils 7; and iii) the alignment information defining the alignment between the alignment head 5 and the display 2 of the tablet PC 3 (determined by the display to alignment head referencing circuit 25), to determine calibration data for the X-Y digitiser 1 which it outputs to the tablet PC 3 via the tablet PC interface 21.

Display to Alignment Head Referencing Circuit

As discussed above, the function of the display to alignment head referencing circuit 25 is to determine the approximate alignment between the alignment head 5 and the display 2 of the tablet PC 3. This is achieved through image processing of the images generated by the two cameras 13-1 and 13-2 mounted on the alignment head 5. FIG. 4 schematically illustrates the fields of view 41-1 and 41-2 of the two cameras 13-1 and 13-2 respectively. The respective origins 43-1 and 43-2 of the fields of view 41 are defined to be the optical axis of the corresponding camera 13 whose X-Y position on the alignment head 5 is known. During the calibration process, the tablet PC 3 illuminates two predetermined pixels 45-1 and 45-2 that will be within the fields of view 41 of the cameras 13. The X-Y pixel positions of these illuminated pixels are known to the calibration computer 6 and are stored in the alignment head data 27. The display to alignment head referencing circuit 25 then processes the images generated by the frame grabbers 23 to determine the misalignment between the origins 43 and the corresponding illuminated pixels 45. In particular, it determines $XCCD_{pix1}$ and $YCCD_{pix1}$ and $XCCD_{pix2}$ and $YCCD_{pix2}$. These two offsets allow the display to alignment head referencing circuit 25 to determine (using known referencing techniques) an appropriate mapping (offset and rotation) between the X-Y coordinate system of the alignment head 5 and the X-Y pixel coordinate system of the display 2. As will be described below, the calibration data generator 31 uses this mapping to determine the pixel positions corresponding to each of the coils 7 on the alignment head 5.

Calibration Data Generator

The function of the calibration data generator 31 is to determine the appropriate calibration data for the current tablet PC 3 under test. To do this, the calibration data generator 31 uses the mapping determined by the display to alignment head referencing circuit 25 in order to map the alignment head X-Y position of each coil 7 into the pixel coordinate system of the display 2, thereby identifying the respective pixel adjacent to which each coil 7 is located. In the following description, these pixel positions will be referred to as the "optical" X-Y pixel position for the coil 7.

The calibration data generator 31 then causes each of the coils 7 to be energised in turn and stores the corresponding digitiser X-Y position information received back from the tablet PC 3 in response. In this embodiment, the sensed X-Y position received from the tablet PC 3 is also defined in terms of the pixel coordinate system of the display 2. The calibration data generator 31 can then generate (for the X-Y position corresponding to each coil 7) position error data representing the difference between the optical X-Y pixel position for the coil 7 and the corresponding sensed X-Y pixel position. This error may be defined, for example, either as an offset in the X and Y directions or as a magnitude and direction error. The calibration data generator 31 then uses the position error data generated for all of the coils 7 in the array to generate the above described correction map. This correction map is then downloaded back into a non volatile memory (not shown) of the X-Y digitiser 1 in the tablet PC 3.

This correction map is then used during normal use of the tablet PC 3 in order to correct for the non-linearities of the digitiser 1 and to correct for any misalignment between the X-Y digitiser 1 and the display 2 of the tablet PC 3. In particular, when the X-Y position of a stylus (not shown) is detected above the display 2, the digitiser 1 uses the sensed X-Y position to address the correction map data generated by the calibration generator 31, to determine, for example, appropriate X and Y offset values to be applied to the sensed X and Y position values. Since the calibration data will only be provided for discrete points on the display (corresponding to the positions of the coils 7 in the array of the alignment head 5), the digitiser 1 will have to interpolate the correction values in the correction map for positions between those corresponding to the coils 7.

Calibration Method

Various different calibration methods may be used to determine the calibration data for the current tablet PC 3. The particular method used in this embodiment is illustrated in the flow chart shown in FIG. 5.

As shown, in step S1, the calibration computer 6 uses the jig (not shown) to place the alignment head 5 over the host (tablet PC 3) display 2. The calibration computer 6 then reads, in step S3, control data for the current host system. This control data will include, among other things, the X-Y pixel positions of the pixels that will be illuminated on the screen which are used to determine the alignment between the alignment head 5 and the display 2. Then, in step S5, the calibration computer 6 determines the position and orientation of the alignment head 5 relative to the display 2 in the manner discussed above.

The processing then proceeds to step S7 where the calibration computer 6 signals to the digitiser 1 that it is about to start the scanning of the coils 7 on the alignment head 5. The processing then proceeds to step S9 where the calibration computer 6 signals to the digitiser 1 that it is about to power the next coil 7 in the array. In step S11, the calibration computer 6 powers the selected coil 7 and then in step S13 the calibration computer 6 captures and stores the X-Y position data output from the X-Y digitiser 1 for that coil 7. The processing then proceeds to step S15 where the calibration computer 6 signals to the digitiser 1 that it has completed processing for that coil 7. In step S17, the calibration computer 6 checks to see if all of the coils 7 in the array have been processed in the above manner. If they have not, then the processing returns to step S9.

Once all of the coils 7 of the array have been processed in the above way, the calibration computer 6 determines, in step S19, the correction map for the current host system. The processing then proceeds to step S21 where the calibration computer 6 programs the digitiser 1 of the current host system with the generated correction map. Finally, the calibration computer generates, in step S23, a report on the digitiser performance. This report can be used, for example, to assess the quality of the assembly procedure used to assemble the host system. Further, by analysing the reports for one or more different host devices, the system can identify problems in the assembly procedure used to assemble the host device, problems with the integration of the digitiser with the host device and possible problems with the build of the digitiser. These reports can also be used to identify and diagnose problems resulting from changes to the design of the host hardware with which the digitiser is integrated. The reports can also be used for quality control purposes, for instance by comparing the calibration data generated for the digitiser with predefined limits and warning if they lie outside those limits. The reports, or some less-detailed information derived from them, may be useful as a certification of the accuracy of the assembled device.

For an array having several thousand coils, this calibration procedure can be completed in a few tens of seconds since mechanical movement of a robot is not required. The limiting factor for speed is now dependent on the number of coils 7 in the array and the speed at which the digitiser 1 can determine a position measurement for each coil 7 when it is energised. This may typically be over 100 samples per second. In some embodiments, electromagnetic background noise may reduce the ability of the digitiser 1 to accurately sample the position of each coil 7 when it is energised. In this case, it may be necessary to cause the digitiser 1 to sense the X-Y position of each coil 7 a number of times and to average the result. Alternatively or in addition, the AC drive current applied to the coil 7 may be increased so that the signal detected by the digitiser 1 is well above those normally sensed by a stylus, so that any noise has less impact.

SUMMARY AND ADVANTAGES

A calibration system has been described above which uses an array of magnetic field generators (coils 7) to determine a correction map for an X-Y digitiser 1 forming part of a tablet PC 3. The correction map is used by the digitiser 1 to reduce errors caused by any misalignment between the X-Y digitiser 1 and the display 2 of the tablet PC 3. The correction map will also correct for the non-linearities of the X-Y digitiser 1.

Further, since a two dimensional array of magnetic field generators is provided, it is not necessary to use a robotic arm to mechanically move a test stylus over the display. It is therefore possible to determine the calibration data for a host product more rapidly than with the robotic arm type prior art system. This therefore makes it possible to test and to generate calibration data for each host product in a production line.

Further, the accuracy of the calibration system described above depends only on the accuracy with which the conductors of the coils 7 can be placed on the printed circuit board. As those skilled in the art will appreciate, this is much simpler than a robotic arm system, in which achieving accurate calibration requires a complex robotic arm which is expensive to make and troublesome to maintain.

In addition to the above, the alignment head 9 is relatively cheap and quick to manufacture due to the use of conventional printed circuit board techniques and the use of simple transistors and resistors to control the switching of the coils 7.

With the above calibration system, it is possible to eliminate the need for "user calibration" (e.g. as used in Microsoft's V1.0 Windows XP for tablet PC), because the purpose of this user calibration is largely to align (with software correction) the X-Y digitiser and the display pixels.

Alternative Embodiments and Modifications

In the above embodiment, a planar array of coils 7 was provided on the alignment head 5. Each coil 7 was designed to emulate the magnetic field generated by a position indicator, such as a stylus typically used with the type of host devices described above. These styluses usually include a ferrite core and a coil wound around the core. Although the single coils 7 can generate magnetic fields similar to those of the actual stylus, it is preferable, for greater accuracy, to use a larger number of coils (ie 2 or more coils). FIG. 6a schematically illustrates the magnetic core 51 and the coil 53 that is wound around the magnetic core 51. FIG. 6a also shows the magnetic field 55 that is generated when a current flows in the coil 53. FIG. 6b schematically illustrates how a magnetic field 56 generated by current flowing in three air cored coils 57-1, 57-2 and 57-3 can approximate the magnetic field 55 generated by the stylus. Although the magnetic field 56 loses the approximation within the dashed area 59, this does not matter as this part of the magnetic field 56 never interacts with the digitiser 1 and therefore is never detected. As shown in FIG. 6b, each of the coils 57 is driven independently by a respective drive current $i_1$, $i_2$ and $i_3$ respectively. The drive currents that are applied will depend upon the spacing between each coil 57 and upon the magnetic field to be emulated. For equal spaced coils 57 (as shown in FIG. 6b) and for the magnetic field shown in FIG. 6a, typically $i_1$ and $i_3$ will be approximately equal and $i_2$ will be of the order of two times that of $i_1$ and $i_3$.

As those skilled in the art will appreciate, in an embodiment using the three coil structure shown in FIG. 6b, the three coils 57 may be provided on three separate printed circuit boards spaced by appropriate spacers. This is illustrated in FIG. 6c. In particular, FIG. 6c shows the calibration computer 6 which is connected to three separate printed circuit boards 71-1, 71-2 and 71-3, which are spaced apart by spacers 73-1 to 73-4. Further, each coil 7 of the alignment head 5 shown in FIG. 2 would be replaced by a triplet of coils 57-1, 57-2 and 57-3, one on each of the three circuit boards 71-1, 71-2 and 71-3. In order to avoid a large number of cross connections between the printed circuit boards 71, the system shown in FIG. 6c preferably repeats the alignment head switching circuitry shown in FIG. 2 for each printed circuit board 71 and the calibration computer 6 would generate and output appropriate drive and row/column select signals for each circuit board 71. A similar arrangement can be provided for a system having any number of spaced coils.

In the above embodiments, the test coils 7, 57 used in the alignment head 5 have had their magnetic axes perpendicular to the display 2 of the host device 3. Alternatively, or in addition, the coils 7, 57 may be tilted so that the calibration computer 6 can capture "tilted pen" data in order to provide improved accuracy with a tilted stylus. This may be achieved, for example, by mounting the alignment head 5 shown in FIG. 2 on a platform (not shown) which can be tilted relative to the display 2. Alternatively, for the alignment head shown in FIG. 6c, the spacers 73 may be deformable or moveable (as illustrated in FIG. 7) in order to simulate different amounts of tilts and tilts in different directions. Alternatively still, it is possible to emulate a tilted stylus using two or more coils having a substantially common magnetic centre and whose axes are in different directions, by varying the amount of current applied to each coil. For example, where tilt is to be simulated in one direction, this can be achieved by varying the current applied to two substantially orthogonal coils. Where tilt is to be simulated in two directions, this can be achieved by varying the current that is applied to three or more coils. As with the previous embodiments, these coils may be formed from wound conductors or from conductive tracks on a printed circuit board.

FIG. 8 schematically illustrates how two orthogonal coils may be generated as conductive tracks on a printed circuit board. In particular, FIG. 8 illustrates a first coil 81 having a magnetic axis (indicated by the axis Z) perpendicular to the page. The second coil 83 is formed from conductor tracks on two layers of the printed circuit board, with the tracks on one layer being shown in phantom and with the conductor tracks on the other layer being shown with solid lines. As a result of the separation between the two layers, the coil 83 will have a magnetic axis that is directed in the Y direction shown in FIG. 8. In particular, the winding 83 forms a flattened solenoid coil. A third orthogonal coil (not shown) can be provided if desired by rotating the coil 83 through ninety degrees so that the magnetic axis of the third coil is in the X direction shown in FIG. 8. The magnetic field generated by a tilted stylus can then be simulated by controlling the ratio of the currents applied to the coils. As those skilled in the art will appreciate, in an embodiment that employs an array of such coils, each of the coils 7 shown in FIG. 2 would be replaced by the corresponding set of coils (such as those shown in FIG. 8).

In an embodiment where calibration data is generated for different tilts, a separate correction map could be generated for each different tilt. In use, the system would then determine the tilt of the stylus and then use the stored correction map for that tilt. Alternatively, the calibration data that is generated could simply be a set of calibration data obtained for different test x,y,z positions and tilts, with the appropriate correction data for a measured x,y,z position and a measured tilt then being determined by interpolating the set of calibration data.

In the above embodiment, current was applied to a selected coil in an array of coils. Two conductors were provided spaced closely together between each row of coils 7 in order to carry this current. These conductors are spaced as close together as possible in order to minimise stray electromagnetic emissions. Where these conductors are provided by wires, these stray emissions may be further suppressed by using twisted wire pairs or by magnetically shielding them as appropriate. Where these conductors are provided as conductors on a PCB, a similar effect to the twisted pair can be achieved by using both sides of the PCB and by crossing the conductors over each other.

In the above embodiment, the calibration computer 6 was arranged to generate a correction map for the tablet PC under test using the position error data obtained from each coil 7 in the array. As those skilled in the art will appreciate, this correction map may take a wide variety of different forms. For instance, it may comprise the position error data itself, to be used by interpolation. Alternatively, it may comprise the coefficients of a multivariate polynomial that transforms measured coordinates (X and Y, and perhaps also Z and tilt) to corrected coordinates. Alternatively still, it may comprise a set of parameters to be used in the process of calculating those measured coordinates. The correction map may also include all of the above. Many other possibilities will be apparent to those skilled in the art.

In the above embodiment, a two dimensional array of air cored coils 7 was used to simulate a position designating device (such as a stylus) that would be used with the tablet PC during normal use. It is also possible to insert magnetic core materials inside the coils 7 or to use pre-wound coils which may, for example, then be soldered on to the printed circuit board. Alternatively, each of the coils 7 in the array may be replaced by a stylus similar to the one that will be used with the host device during normal use. In such an embodiment, connections would have to be made to the magnetic field generator (e.g. resonator) in each stylus to be able to open circuit the magnetic field generator so that each stylus in the array of styluses can be individually selected to cooperate with the X-Y digitiser. Alternatively, where styluses are used that employ resonant circuits, the resonant frequency of each stylus may be different so that the "selection" can be done by the X-Y digitiser 1 selecting the appropriate excitation frequency to transmit for energising the selected stylus. However, such an embodiment is not preferred as it would require the X-Y digitiser to be able to operate over a relatively large range of frequencies to be able to energise and detect all the styluses at the different operating frequencies.

In the above embodiment, the calibration computer 6 determined calibration data for a digitiser 1 under test. In an alternative embodiment, the digitiser 1 or the host device 3 may be arranged to carry out the calibration function itself. In this case, the calibration computer 6 would form part of the digitiser 1 or host device 3, although the image processing circuits used to determine the alignment between the alignment head 5 and the display 2 would probably be provided by some external processing device in order to minimise the complexity of the digitiser 1 or host device 3. The digitiser 1 or the host device 3 can then determine the above described "optical" X-Y position of each of the coils 7 which it can then compare with the corresponding sensed X-Y position when that coil 7 is energised. In such an embodiment, the energising of the coils 7 may be controlled either by the X-Y digitiser 1 or the host device 3 or by the external processing device.

In the above embodiment, the calibration computer 6 determined calibration data when the alignment head 5 was at a fixed height above the display 2. Alternatively, the calibration computer 6 may be arranged to vary the height of the alignment head 5 above the display 2 and to capture calibration data for the system at more than one height. In such an embodiment, mechanical movement of the alignment head 5 can be avoided by employing further alignment head PCB's at different heights above the display 2 or by applying different weighted drive signals to simulate a stylus at a different heights.

In the embodiment described above, the calibration procedure included the transmission of hand shaking and status signals between the calibration computer 6 and the digitiser 1. In some circumstances, it may be possible to simplify this scheme. For example, the calibration computer 6 may simply switch current from coil to coil with appropriate timing, and the X-Y digitiser would then parse the data accordingly, using an algorithm to spot when the different coils 7 are switched.

In the above embodiment, the coils 7 were arranged on the alignment head 5 in two dimensions across the area of interest. It is convenient to arrange these coils in an X-Y grid pattern as illustrated in FIG. 2. However, it is not essential to arrange the coils 7 in such a regular (evenly spaced) array. For example, a greater density of coils 7 may be placed at positions where the greatest improvement in accuracy is expected to be needed, such as those corresponding to the edges and corners of the display 2. Regardless of the particular arrangement of the coils 7 on the alignment head 5, the same type of switching circuitry can be used to control the selection of each coil in turn.

In the above embodiments, the coils 7 in the array were individually addressed using column select and row select signals with appropriate switches. As those skilled in the art will appreciate, it is not essential to use such row select and column select signals and switches. Instead, dedicated signal lines may be provided to each coil 7 in the array. However, as those skilled in the art will appreciate, such an embodiment is not preferred in view of the number of signal lines required for a given array.

As discussed above, the calibration system described in the main embodiment can be used for any type of inductive X-Y digitiser. As those skilled in the art will appreciate, there are generally two types of inductive X-Y digitiser systems—those employing a passive type position indicator (e.g. a resonant stylus) and those employing an active type position indicator (e.g. a powered stylus). With the passive type position indicator, the digitiser must energise the position indicator and then receive the magnetic field transmitted back from the position indicator. For these types of systems, the calibration computer 6 preferably synchronises the driving of the selected coil 7 with the digitiser 1. This can be achieved, for example, by using the digitiser 1 to directly generate the AC drive signal which is supplied to the selected coil 7 via the calibration computer 6 (or via some other device) through an appropriate electrical or inductive connection between the digitiser 1 and the calibration computer 6. Alternatively, the calibration computer 6 may detect the digitiser's standard interrogation signal and then synthesise an appropriately timed AC reference signal in response. For active type position indicator systems, for example one where the position indicator emits a continuous AC field whose frequency depends on its status (such as the pressure applied to the tip), a continuous sine wave may be appropriate for the AC component of the drive signal. In this case, there is no need for synchronisation between the calibration computer 6 and the digitiser 1.

In the above embodiment, the calibration computer 6 included a tablet PC interface 21 for interfacing with the tablet PC 3. This allowed the calibration computer 6 to be able to communicate with the digitiser 1 of the tablet PC 3. This interface may be implemented using a direct electrical connection. Alternatively, this interface 21 may be implemented inductively using the coils 7 on the alignment head 5 and coils (not shown) of the digitiser 1. For example, it is possible for the calibration computer 6 to send data to the digitiser 1 by modulating the AC component of the drive signal applied to the selected coil 7 and/or by varying the coil that is powered, in what pattern and with what timing. The modulation of the AC drive component may be achieved using frequency, amplitude or phase modulation as will be apparent to those skilled in the art of communications. Where a digitiser is used which transmits an interrogation signal for energising or for communicating with the stylus, a reverse communications link can be implemented by modulating the stylus interrogation signal. For example, the rate, frequency, amplitude or phase of this interrogation signal can be varied in order to transmit data back from the digitiser 1 to the calibration computer 6. As those skilled in the art will appreciate, the above techniques add little complexity to the existing digitiser hardware and do not require a separate dedicated interface on the tablet PC that is used solely for calibration purposes.

As those skilled in the art will appreciate, in the above embodiment, there is a minimum practical spacing between the coils 7 on the alignment head 5, thereby limiting the ability of the system to generate a correction map describing errors that change rapidly with position. This problem may be overcome by attaching the array of coils 7 to a precise X-Y actuator which can move the array of coils 7 in the X and Y directions. In this case, the actuator need only have a small travel (less than the coil repeat distance) so that its speed and complexity are much smaller issues than for a robot covering the whole area of interest. Where such an actuator is used, it could also be used to align the array of coils 7 with the display pixels, thereby simplifying other aspects of the calibration process.

In the above embodiment, the calibration computer was arranged to determine calibration data for each host device that is assembled in a production line. As those skilled in the art will appreciate, it is not essential to generate the calibration data for each host product. For example, calibration data may be generated for a selection of test host devices, with the resulting calibration data then being processed (analysed) to generate representative calibration data that will be stored in all non-test host devices. The representative calibration data may represent the average of the calibration data that is generated for the test host devices or it may represent some more statistically meaningful representation. For example, if one of the test host devices generates calibration data which is significantly different from the calibration data generated for the other host devices, then that calibration data may simply be ignored and not used to generate the representative calibration data.

In the above embodiment, the alignment head 5 included two cameras 13 which were used to determine the relative position and orientation of the alignment head 5 and the display 2 of the host device. As those skilled in the art will appreciate, it is not essential to provide such cameras 13 on the alignment head 5. Other techniques can be used to determine the alignment between the alignment head 5 and the display 2. For example, the alignment head 5 may include a bracket which is designed to fix on to the display 2 or on to the housing of the host device in a rigid manner. In such an embodiment the alignment between the alignment head 5 and the display 2 will be known in advance and will depend upon the design of the bracket. In such an embodiment, since the mapping between the alignment head 5 and the display 2 will be known in advance, it is possible to store the X-Y positions of the magnetic field generators in terms of the pixel coordinate system rather than in terms of the alignment head coordinate system. However, such an embodiment is not preferred as it complicates the design of the alignment head 5 and the bracket may cause damage to the host device during testing. Alternatively, some other mechanical mechanism may be provided to locate the alignment head and the host device in predetermined relative positions.

Alternatively still, some other type of sensor may be provided on the alignment head 5 which can sense features of the host device. For example, an LVDT sensor may be provided on the alignment head which is designed to sense the position of a feature on the host device. However, cameras are preferred because of their sensing resolution and availability.

In the above embodiment, two cameras were used to determine the relative position and orientation of the alignment head 5 and the display 2 of the host device. As those skilled in the art will appreciate, it is not essential to use two cameras. Any number of cameras could be used. For example, the alignment head may only include a single camera, in which case, the image processing would have to identify the relative position of at least two features on the host device from the single image of the camera. For example, if two pixels are illuminated within the field of view of the single camera, a determination of the relative positions of those pixels within the field of view can be used to determine the mapping between the coordinate system of the alignment head 5 and the coordinate system of the display 2. Alternatively still, if the resolution of the camera is high enough the image processing can also determine the relative orientation between the alignment head 5 and the display 2 from the orientation of the pixel grid in the field of view.

In the above embodiment, the calibration data generator 31 converted the known X-Y positions of each of the magnetic field generators into the corresponding pixel positions on the display 2. The X-Y digitiser 1 was also arranged to output the sensed position in terms of the corresponding pixel position. However, as those skilled in the art will appreciate, the X-Y digitiser can usually sense position at a resolution that is greater than the resolution of the pixels. Therefore, provided the camera 13 on the alignment head 5 also has a resolution greater than the resolution of the pixels, the mapping between the known X-Y positions of the magnetic field generators and the optical X-Y positions can also be made at a higher resolution, thereby allowing the calculation of more accurate calibration data.

In the above embodiment, the calibration data that was stored (the correction map) was for use in correcting the position (and tilt) determined by the digitiser. However, as those skilled in the art will appreciate, the calibration data that is generated may be for use at any stage before, during or after the position measurement calculations that are made by the digitiser. For example, the correction map may determine scaling factors to be applied to the signal levels returned from the digitiser's hardware, or parameters in some formula used in the middle of the position calculations. In some cases, a rough position may be needed before the correction can be applied. This may be obtained by a preliminary calculation or from a previously calculated position.

In the above embodiments, it was assumed that the digitiser calculated position measurements when each of the magnetic field generators was energised. As those skilled in the art will appreciate, some or all of those calculations may be carried out by the host device. Equivalently, the host system's processing resources may from time to time be considered as part of the digitiser.

In the above embodiment, the drive circuitry used to generate the appropriate drive signal for application to the selected magnetic field generator was provided in the calibration computer 6. As those skilled in the art will appreciate, this drive circuitry may be provided on the alignment head 5, with appropriate control signals for controlling the drive circuitry being provided by the calibration computer 6. Preferably, such drive circuitry would be mounted on the same printed circuit board as the magnetic field generators and the switching circuitry used to select each magnetic field generator in turn.

In the above embodiment, the calibration system was used to calibrate a host device having a display and a digitiser located under the display. As those skilled in the art will appreciate, it is not essential for the host device to have such a display. For example, the host device may be an X-Y digitiser tablet.

Further, where a display is provided, the digitiser may be provided over the display provided its sensor coils are made of a transparent material. Still other arrangements are possible: for example, part of the digitiser may lie above the display and part below.

In the above embodiments, only one magnetic field generator was energised at any one time. As those skilled in the art will appreciate, with some digitiser designs it is possible to obtain usable data for more than one position indicator at once. For such digitisers, it may be appropriate to enable multiple magnetic field generators at the same time, thus obtaining a larger amount of calibration data at each measurement.

In the above embodiment, the operation of the calibration computer was described in terms of hardware circuits. As those skilled in the art will appreciate, these circuits can be provided by dedicated circuits or by programmable circuits that are programmed by suitable software. This software can be loaded into the calibration computer via a CD ROM or the like or it may be downloaded as a signal over a computer network.

What is claimed is:

1. A calibration system for determining calibration data for a host device having an X-Y digitiser, the system comprising:
    an alignment head comprising: i) an array of magnetic field generators in which the relative position of each magnetic field generator is known; and ii) a selector operable to select a magnetic field generator of the array;
    a calibration controller operable to control the selector to control the selection of said magnetic field generator;
    a drive circuit operable to energise the selected magnetic field generator to cause the selected magnetic field generator to generate a magnetic field for interaction with the X-Y digitiser; and
    a calibration data generator operable: i) to receive digitiser signal values from said X-Y digitiser in response to the interaction with the magnetic field generated by the selected magnetic field generator; and ii) to generate calibration data for the X-Y digitiser using the digitiser signal values for the selected magnetic field generator and the known position of the selected magnetic field generator.

2. A system according to claim 1, wherein one or more of said magnetic field generators is a coil of conductor.

3. A system according to claim 1, wherein one or more of said magnetic field generators comprises a plurality of coils.

4. A system according to claim 3, wherein one or more of the coils of the one or more magnetic field generator is individually drivable.

5. A system according to claim 3, wherein the coils of a magnetic field generator have different magnetic axes and have a substantially common magnetic centre.

6. A system according to claim 4, wherein said drive circuit is operable to apply a respective drive signal to each coil of the selected magnetic field generator in order to vary an effective magnetic axis of the magnetic field generator in order to simulate the effects of tilt, and wherein said calibration data generator is operable to generate calibration data for different simulated tilts.

7. A system according to claim 4, wherein the plurality of coils of the or each magnetic field generator have a common magnetic axis and are spaced apart along said axis.

8. A system according to claim 1, further comprising an actuator operable to move the alignment head relative to the host device.

9. A system according to claim 1, wherein said array of magnetic field generators is a substantially two dimensional array with magnetic field generators positioned in X and Y directions.

10. A system according to claim 9, wherein the magnetic field generators are arranged in a regular array in which the spacing between the magnetic field generators is uniform.

11. A system according to claim 9, wherein the magnetic field generators are arranged with non-uniform spacing such that a higher density of magnetic field generators is provided towards the edge of the array than in the centre of the array.

12. A system according to claim 1, wherein said alignment head comprises a locator for use in relating the known positions of the magnetic field generators with corresponding positions on the host device.

13. A system according to claim 12, wherein said locator comprises a mechanical locator which is operable to mechanically locate the alignment head in a predetermined position relative to the host device.

14. A system according to claim 12, wherein said locator is a sensor for sensing features of the host device, wherein said calibration data generator further comprises a mapping generator operable to generate a mapping between a coordinate system of the alignment head and a coordinate system of the host device, wherein the known relative positions of said magnetic field generators are defined in terms of said alignment head coordinate system, and wherein said calibration data generator is operable to use the generated mapping to determine a mapped position of the selected magnetic field generator in terms of the coordinate system of the host device and is operable to generate the calibration data for the X-Y digitiser using the digitiser signal values for the selected magnetic field generator and the mapped position of the selected magnetic field generator.

15. A system according to claim 14, wherein said locator is an optical sensor which is operable to detect the position of optical features on said host device relative to the alignment head.

16. A system according to claim 15, wherein said optical sensor comprises a camera having a field of view and wherein said calibration data generator comprises image processing circuitry operable to process the image from said camera to determine the relative position of one or more optical features within the field of view of the camera in order to determine said mapping between the alignment head coordinate system and the coordinate system of the host device.

17. A system according to claim 16, comprising two or more cameras and image processing circuitry for processing the image from each camera to detect the position of one or more optical features on the host relative to the field of view of the respective cameras.

18. A system according to claim 14, wherein said host device includes a display, wherein said calibration data generator is operable to map the coordinate system of the alignment head to a coordinate system of the display and wherein said X-Y digitiser is operable to measure the position of the selected magnetic field generator in terms of the coordinate system of the display as said digitiser signal values.

19. A system according to claim 1, wherein said selector comprises a plurality of switches coupled between said drive circuit and said array of magnetic field generators.

20. A system according to claim 19, wherein said switches are unipolar switches and wherein said drive circuit is operable to generate a drive signal comprising an AC component and a DC component for preventing the AC component from reverse biasing said switches.

21. A system according to claim 19, wherein said magnetic field generators comprise coils on one or more printed circuit boards and wherein said switches are mounted on said one or more printed circuit boards with said coils.

22. A system according to claim 19, further comprising a plurality of row select signal lines and a plurality of column select lines coupled between said switches and said calibration controller and operable to carry control signals generated by said calibration controller to said switches to control the state of said switches and thereby the selection of said magnetic field generator.

23. A system according to claim 1, wherein said calibration controller and said calibration data generator are provided in a calibration computer.

24. A system according to claim 23, wherein said calibration computer forms part of said X-Y digitiser.

25. A system according to claim 1, wherein said drive circuit is provided on said alignment head.

26. A system according to claim 1, wherein said calibration data generator is operable to generate said calibration data by comparing a measured position of the selected magnetic field generator with the known relative position of the selected magnetic generator.

27. A system according to claim 26, wherein said calibration data generator is operable to generate, as said calibration data, error data representing the difference in position between the measured position for the selected magnetic field generator and the known relative position of the selected magnetic field generator.

28. A system according to claim 26, wherein said calibration data generator is operable to generate error data for each magnetic field generator of the array, which error data represents the difference in position between the measured position for the magnetic field generator and the known relative position of the magnetic field generator and is operable to generate a correction map as said calibration data using the error data generated for the magnetic field generators in the array.

29. A system according to claim 28, wherein said calibration data generator is operable to generate data representative of a calibration function as said correction map, which function relates a measured position to correction data for that measured position or to a corrected measured position.

30. A system according to claim 29, wherein said calibration data generator is operable to generate data representative of a calibration function as said correction map, which function relates a measured position and tilt to correction data for that measured position and tilt or to a corrected measured position.

31. A system according to claim 1, wherein said calibration data generator is operable to store the generated calibration data in said host device for use by said X-Y digitiser to calibrate X-Y position measurements made thereby.

32. A system according to claim 1, further comprising a calibration data analyser operable to analyse first calibration data generated for a plurality of test host devices and operable to generate second calibration data representative of the first calibration data.

33. A system according to claim 32, operable to store said second calibration data within one or more non-test host devices.

34. A system according to claim 1, further comprising a calibration data analyser operable to analyse the calibration data obtained for a digitiser to determine if there are any faults.

35. A system according to claim 34, wherein said calibration data analyser is operable to compare said calibration data with corresponding calibration data obtained from previous devices.

36. A system according to claim 35, wherein said calibration data analyser is operable to compare said calibration data or data derived from the calibration data with predetermined limits and is operable to identify a fault if said calibration data falls outside those limits.

37. An alignment head for use in the calibration system according to claim 1, the alignment head comprising:
an array of magnetic field generators in which the relative position of each magnetic field generator is known;
a locator for use in relating the known relative positions of the magnetic field generators with corresponding positions on the host device; and
a selector operable to select a magnetic field generator of the array.

38. An alignment head according to claim 37, wherein one or more of said magnetic field generators is a coil of conductor.

39. An alignment head according to claim 37 or 38, wherein said locator comprises a mechanical locator which is operable to mechanically locate the alignment head in a predetermined position relative to the host device.

40. An alignment head according to claim 37 or 38, wherein said locator comprises a sensor for sensing predetermined features of the host device.

41. A calibration computer for use in the calibration system of claim 1, the calibration computer comprising:
a calibration controller operable to control the selector of the alignment head, to control the selection of said magnetic field generator;
a receiver operable to receive digitiser signal values from the X-Y digitiser in response to the interaction with the magnetic field generated by the selected magnetic field generator; and
a calibration data generator operable to generate calibration data for the X-Y digitiser using the digitiser signal values for the selected magnetic field generator and the known relative position of the selected magnetic field generator.

42. A calibration computer according to claim 41, wherein said calibration data generator is operable to generate said calibration data by comparing a measured position of the selected magnetic field generator with the known relative position of the selected magnetic field generator.

43. A method of determining calibration data for a host device having an X-Y digitiser, the method comprising:
placing an array of magnetic field generators in which the relative position of each magnetic field generator is known, over the host device;
selecting a magnetic field generator of the array;
energising the selected magnetic field generator to cause the selected magnetic field generator to generate a magnetic field for interaction with the X-Y digitiser;

receiving digitiser signal values from the X-Y digitiser in response to the interaction with the magnetic field generated by the selected magnetic field generator;

generating calibration data for the X-Y digitiser using the digitiser signal values for the selected magnetic field generator and the known relative position of the selected magnetic field generator; and storing the generated calibration data for use by said X-Y digitiser.

44. A method of manufacturing a host device having an X-Y digitiser, the method comprising:

mounting the X-Y digitiser in the host device;

positioning an array of magnetic field generators in which the relative position of each magnetic field generator is known adjacent the host device;

selecting a magnetic field generator of the array;

energising the selected magnetic field generator to cause the selected magnetic field generator to generate a magnetic field for interaction with the X-Y digitiser;

receiving digitiser signal values from said X-Y digitiser in response to the interaction with the magnetic field generated by the selected magnetic field generator;

generating calibration data for the X-Y digitiser using the digitiser signal values for the selected magnetic field generator and the known relative position of the selected magnetic field generator; and storing the generated calibration data in the host device for use by said X-Y digitiser.

45. A method of manufacturing a host device having an X-Y digitiser, the method comprising:

providing one or more test host devices, each having an X-Y digitiser, determining first calibration data for the or each test host device by:

i) placing an array of magnetic field generators, in which the relative position of each magnetic field generator is known, adjacent to the X-Y digitiser of the test host device;

ii) selecting a magnetic field generator of the array;

iii) energising the selected magnetic field generator to cause the selected magnetic field generator to generate a magnetic field for interaction with the X-Y digitiser of the test host device;

iv) receiving digitiser signal values from the X-Y digitiser of the test host device, in response to the interaction with the magnetic field generated by the selected magnetic field generator; and v) generating first calibration data for the test host device using the digitiser signal values for the selected magnetic field generator and the known position of the selected magnetic field generator;

determining second calibration data representative of the or each first calibration data generated for the or each test host device;

mounting an X-Y digitiser in a non-test host device; and storing the second calibration data into the non-test host device.

46. A host device comprising:

an X-Y digitiser for sensing X-Y positions of a position indicator relative to a work surface of the host device; and a memory storing calibration data generated by:

placing an array of magnetic field generators, in which the relative position of each magnetic field generator is known, over the host device;

selecting a magnetic field generator of the array;

energising the selected magnetic field generator to cause the selected magnetic field generator to generate a magnetic field for interaction with the X-Y digitiser;

receiving digitiser signal values from the X-Y digitiser in response to the interaction with the magnetic field generated by the selected magnetic field generator; and generating calibration data for the X-Y digitiser using the digitiser signal values for the selected magnetic field generator and the known relative position of the selected magnetic field generator.

47. A host device comprising:

an X-Y digitiser for sensing X-Y positions of a position indicator relative to a work surface of the host device; and a memory storing calibration data generated by:

providing one or more test host devices, each having an X-Y digitiser, determining first calibration data for the or each test host device by:

i) placing an array of magnetic field generators, in which the relative position of each magnetic field generator is known, adjacent to the X-Y digitiser of the test host device;

ii) selecting a magnetic field generator of the array;

iii) energising the selected magnetic field generator to cause the selected magnetic field generator to generate a magnetic field for interaction with the X-Y digitiser of the test host device;

iv) receiving digitiser signal values from the X-Y digitiser of the test host device, in response to the interaction with the magnetic field generated by the selected magnetic field generator; and v) generating first calibration data for the test host device using the digitiser signal values for the selected magnetic field generator and the known position of the selected magnetic field generator;

determining second calibration data representative of the or each first calibration data generated for the or each test host device; and wherein said second calibration data is the calibration data stored in said memory.

48. A host device according to claim 46 or 47, wherein one or more of said magnetic field generators comprises a plurality of coils and wherein said energising step energises each coil of the magnetic field generator individually.

49. A host device according to claim 48, wherein said energising step applies a respective drive signal to each coil of the selected magnetic field generator in order to vary an effective magnetic axis of the magnetic field generator in order to simulate the effects of tilt, and wherein said calibration data generation step generates calibration data for different simulated tilts.

50. A host device according to claim 46 or 47, further comprising the step of using an actuator to move the alignment head relative to the host device.

51. A host device according to claim 46 or 47, further comprising relating the known positions of the magnetic field generators with corresponding positions on the host device.

52. A host device according to claim 51, wherein said relating step comprises using a mechanical locator to mechanically locate the alignment head in a predetermined position relative to the host device.

53. A host device according to claim 51, wherein said relating step comprises sensing features of the host device, wherein said calibration data generating step comprises a step of generating a mapping between a coordinate system of the alignment head and a coordinate system of the host device, wherein the known relative positions of said magnetic field generators are defined in terms of said alignment head coordinate system, and wherein said calibration data generating step uses the generated mapping to determine a mapped position of the selected magnetic field generator in terms of the coordinate system of the host device and generates the calibration data for the X-Y digitiser using the digitiser signal values for the selected magnetic field generator and the mapped position of the selected magnetic field generator.

54. A host device according to claim 53, wherein said sensing step senses the position of optical features on said host device relative to the alignment head.

55. A host device according to claim 54, wherein said sensing step uses a camera having a field of view and wherein said calibration data generating step comprises an image processing step for processing the image from said camera to determine the relative position of one or more optical features within the field of view of the camera in order to determine said mapping between the alignment head coordinate system and the coordinate system of the host device.

56. A host device according to claim 55, wherein said sensing step uses two or more cameras and wherein said image processing step processes the image from each camera to detect the position of an optical feature on the host relative to the field of view of the respective cameras.

57. A host device according to claim 46 or 47, further comprising a display, wherein said calibration data generating step maps the coordinate system of the alignment head to a coordinate system of the display and wherein said X-Y digitiser measures the position of the selected magnetic field generator in terms of the coordinate system of the display as said digitiser signal values.

58. A host device according to claim 46 or 47, wherein said selecting step uses a plurality of switches coupled between a drive circuit and said array of magnetic field generators.

59. A host device according to claim 58, wherein said switches are unipolar switches and wherein said energising step generates a drive signal comprising an AC component and a DC component for preventing the AC component from reverse biasing said switches.

60. A host device according to claim 46 or 47, wherein said calibration data generating step generates said calibration data by comparing a measured position of the selected magnetic field generator with the known relative position of the selected magnetic field generator.

61. A host device according to claim 60, wherein said calibration data generating step generates, as said calibration data, error data representing the difference in position between the measured position for the selected magnetic field generator and the known relative position of the selected magnetic field generator.

62. A host device according to claim 60, wherein said calibration data generating step generates error data for each magnetic field generator of the array, which error data represents the difference in position between the measured position for the magnetic field generator and the known relative position of the magnetic field generator and generates a correction map as said calibration data using the error data generated for the magnetic field generators in the array.

63. A host device according to claim 62, wherein said calibration data generating step generates data representative of a calibration function as said correction map, which function relates a measured position to correction data for that measured position or to a corrected measured position.

64. A host device according to claim 63, wherein said calibration data generating step generates data representative of a calibration function as said correction map, which function relates a measured position and tilt to correction data for that measured position and tilt or to a corrected measured position.

65. A host device according to claims 46 or 47, further comprising the step of analysing the calibration data obtained for the digitiser to determine if there are any faults.

66. A host device according to claim 65, wherein said analysing step compares said calibration data with corresponding calibration data obtained from previous devices.

67. A host device according to claim 66, wherein said analysing step compares said calibration data or data derived from said calibration data with predetermined limits and identifies a fault if said calibration data falls outside those limits.

68. A host device according to claim 46 or 47, wherein said selecting and energising steps are operable to select and to energise a plurality of said magnetic field generators and wherein said generating step is operable to generate said calibration data using: i) digitiser signal values obtained as a result of the interaction between the selected magnetic field generators and the digitiser; and ii) the corresponding known relative positions of the selected magnetic field generators.

* * * * *